(12) United States Patent
Sun et al.

(10) Patent No.: US 12,245,209 B2
(45) Date of Patent: Mar. 4, 2025

(54) DOWNLINK (DL) AND UPLINK (UL) SCHEDULING FOR TRANSMISSION ABOVE 52.6 GHZ

(71) Applicant: Apple Inc., Cupertino, CA (US)

(72) Inventors: Haitong Sun, Cupertino, CA (US); Dawei Zhang, Saratoga, CA (US); Huaning Niu, San Jose, CA (US); Oghenekome Oteri, San Diego, CA (US); Chunhai Yao, Beijing (CN); Chunxuan Ye, San Diego, CA (US); Hong He, San Jose, CA (US); Sigen Ye, Whitehouse Station, NJ (US); Weidong Yang, San Diego, CA (US); Yushu Zhang, Beijing (CN); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/439,680

(22) PCT Filed: Oct. 16, 2020

(86) PCT No.: PCT/CN2020/121435
§ 371 (c)(1),
(2) Date: Sep. 15, 2021

(87) PCT Pub. No.: WO2022/077422
PCT Pub. Date: Apr. 21, 2022

(65) Prior Publication Data
US 2023/0239846 A1    Jul. 27, 2023

(51) Int. Cl.
*H04W 72/0453*    (2023.01)
*H04W 72/02*    (2009.01)
*H04W 72/23*    (2023.01)

(52) U.S. Cl.
CPC ....... *H04W 72/0453* (2013.01); *H04W 72/02* (2013.01); *H04W 72/23* (2023.01)

(58) Field of Classification Search
CPC .. H04W 72/02; H04W 72/23; H04W 72/0453
See application file for complete search history.

(56) References Cited

U.S. PATENT DOCUMENTS 10,721,038 B2 *  7/2020  Kwak .................. H04L 5/0048
10,721,760 B2    7/2020  Kim et al.
(Continued)

FOREIGN PATENT DOCUMENTS

| CN | 109600835 A | 4/2019 |
| CN | 110945940 A | 3/2020 |

(Continued)

OTHER PUBLICATIONS

International Search Report and Written Opinion directed to related International Application No. PCT/CN2020/121435, dated Jul. 15, 2021, 7 pages.

(Continued)

*Primary Examiner* — James P Duffy
(74) *Attorney, Agent, or Firm* — Sterne, Kessler, Goldstein & Fox P.L.L.C.

(57) ABSTRACT

Some aspects of this disclosure relate to apparatuses and methods for implementing downlink and uplink scheduling in communication above 52.6 GHz. For example, some aspects of this disclosure relate to a base station. The base station includes a transceiver configured to communicate over a wireless network with a user equipment (UE) and a processor communicatively coupled to the transceiver. The processor determines that the communication between the base station and the UE is in a frequency range above 52.6 GHz. In response to the determination, the processor disables a frequency main resource assignment (FDRA), modi- (Continued)

fies a Resource Block Group (RBG) size, or modifies a Resource Indication Value (RIV) determination. The processor generates a Downlink Channel Indicator (DCI) based at least on one or more of the disabled FDRA, the modified RBG size, or the modified RIV determination. The processor transmits, using the transceiver, the DCI to the UE.

14 Claims, 11 Drawing Sheets

(56) References Cited

U.S. PATENT DOCUMENTS

| | | | |
|---|---|---|---|
| 10,939,501 | B2 | 3/2021 | Chatterjee et al. |
| 11,399,362 | B2 | 7/2022 | Hwang et al. |
| 12,022,474 | B2 | 6/2024 | Chatterjee et al. |
| 12,069,002 | B2 | 8/2024 | Luo et al. |
| 2017/0048829 | A1* | 2/2017 | Kim .................. H04L 5/0053 |
| 2017/0105206 | A1 | 4/2017 | Määttanen et al. |
| 2020/0267698 | A1 | 8/2020 | Xing et al. |
| 2022/0124698 | A1 | 4/2022 | Noh et al. |

FOREIGN PATENT DOCUMENTS

| | | |
|---|---|---|
| CN | 111096018 A | 5/2020 |
| CN | 111434165 A | 7/2020 |
| CN | 111565461 A | 8/2020 |
| JP | 2020-508612 A | 3/2020 |
| JP | 2020-536400 A | 12/2020 |
| WO | WO 2016053450 A1 | 4/2016 |
| WO | WO 2019093823 A1 | 5/2019 |
| WO | WO 2019/138360 A1 | 7/2019 |
| WO | WO 2019192408 A1 | 10/2019 |
| WO | WO 2020/081662 A1 | 4/2020 |
| WO | WO 2020164404 A1 | 8/2020 |
| WO | WO 2020/204682 A1 | 10/2020 |
| WO | WO 2020198746 A1 | 10/2020 |
| WO | WO 2020198947 A1 | 10/2020 |
| WO | WO 2021/183035 A1 | 9/2021 |

OTHER PUBLICATIONS

Samsung, "Design aspects for extending NR to up to 71 GHz," 3GPP TSG RAN WG1 #102-e, R1-2006136, Aug. 28, 2020 (Aug. 28, 2020), 8 pages.

3rd Generation Partnership Project; Technical Specification Group Radio Access Network; NR; Physical channels and modulation (Release 16), Technical Specification 3GPP TS 38.211, V16.3.0 (Sep. 2020), 133 pages, Copyright 2020.

3rd Generation Partnership Project; Technical Specification Group Radio Access Network; NR; Physical layer procedures for data (Release 16), Technical Specification 3GPP TS 38.214, V16.3.0 (Sep. 2020), 166 pages, Copyright 2020.

Ericsson, "On NR operations in 52.6 to 71 GHz," 3GPP TSG RAN WG1 #102-e, R1-2007046, Aug. 17-28, 2020, 4 pages.

Japanese Office Action Report and English Translation directed to Japanese Patent Application No. 2023-521958, dated Apr. 18, 2024; 9 pages.

Samsung, "Enhancements on configured grant for NR-U," 3GPP TSG RAN WG1 #100-e, e-Meeting, Feb. 24-Mar. 6, 2020, 5 pages.

3GPP TSG RAN WG1 Meeting #90, R1-1712410, Catt, NR DL/UL frequency domain resource allocation, Prague, Czechia, Aug. 21-25, 2017; 4 pages.

3GPP TSG RAN WG1 #101, R1-2003961, CMCC, Discussion on required changes to NR for above 52.6GHZ, e-Meeting, May 25-Jun. 5, 2020; 3 pages.

3GPP TSG RAN WG1 #103-e, R1-2008457, Apple Inc., A Discussion on Physical Layer Design for NR between 52.6GHz and 71 GHz, Oct. 26-Nov. 13, 2020; 32 pages.

Office Action and Search Report directed to related Chinese Application No. 202080106156.1, with English-language machine translation attached, mailed Aug. 16, 2024; 24 pages.

Ericsson, "HARQ and scheduling enhancements for NR-U," 3GPP TSG-RAN WG1 Meeting #98 Bis, Chongqing, China, Oct. 14-Oct. 21, 2019, R1-1910949; 18 pages.

NTT Docomo, Inc., "HARQ enhancement for NR-U," 3GPP TSG RAN WG1 #99, Reno, USA, Nov. 18-22, 2019, R1-1912876; 9 pages.

Ericsson, "On NR operations in 52.6 to 71 GHz," 3GPP TSG-RAN WG1 Meeting #102-e, e-Meeting, Aug. 17-28, 2020, R1-2005920; 37 pages.

Extended European Search Report directed to related European Application No. 24187632.5, mailed Oct. 9, 2024; 14 pages.

Moderator (Huawei), "Email discussion/approval [102-e-NR-L1enh-URLLC-PDCCH enhancements-01] on remaining issues on DCI format design," 3GPP TSG RAN WG1 Meeting #102 e, E meeting, Aug. 17-28, 2020, R1 2xxxxxx; 21 pages.

Notice of Grant and Search Report directed to Chinese Application No. 202080106156.1, with English-language machine translation attached, mailed Dec. 13, 2024; 6 pages.

* cited by examiner

BWP = 14 RBs, LRBmin = 5, BWP_calc. =10

500

| Rbstart \ LRBs | 1 | 2 | 3 | 4 | 5 | 6 | 7 | 8 | 9 | 10 |
|---|---|---|---|---|---|---|---|---|---|---|
| 0 | 0 | 10 | 20 | 30 | 40 | 50 | 49 | 39 | 29 | 19 |
| 1 | 1 | 11 | 21 | 31 | 41 | 51 | 48 | 38 | 28 | |
| 2 | 2 | 12 | 22 | 32 | 42 | 52 | 47 | 37 | | |
| 3 | 3 | 13 | 23 | 33 | 43 | 53 | 46 | | | |
| 4 | 4 | 14 | 24 | 34 | 44 | 54 | | | | |
| 5 | 5 | 15 | 25 | 35 | 45 | | | | | |
| 6 | 6 | 16 | 26 | 36 | | | | | | |
| 7 | 7 | 17 | 27 | | | | | | | |
| 8 | 8 | 18 | | | | | | | | |
| 9 | 9 | | | | | | | | | |

Number of Allocated Resource Blocks (LRBs)

Starting Allocated Resource Block (Rbstart)

*FIG. 5*

DOWNLINK (DL) AND UPLINK (UL) SCHEDULING FOR TRANSMISSION ABOVE 52.6 GHZ

BACKGROUND

Field

The described aspects generally relate to downlink (DL) and uplink (UL) scheduling in transmission above 52.6 GHz. For example, some aspects of this disclosure relate to designs for frequency domain resource allocation (FDRA) and/or time domain resource allocation (TDRA).

Background

A user equipment (UE) communicating with a base station (for example, an evolved Node B (eNB), a next generation Node B (gNB), etc.) over a communication link can use an uplink control channel to transmit control and measurement information to the base station and can use an uplink data channel to transmit data to the base station. The base station can use a downlink control channel to transmit control information to the UE indicating how to use resources on the uplink channel(s).

SUMMARY

Some aspects of this disclosure relate to apparatuses and methods for implementing downlink (DL) and uplink (UL) scheduling in transmission above 52.6 GHz, e.g., for 3rd Generation Partnership Project (3GPP) releases, such as release 17 (Rel-17).

Some aspects of this disclosure relate to a base station. The base station includes a transceiver configured to communicate over a wireless network with a user equipment (UE) and a processor communicatively coupled to the transceiver. The processor determines that the communication between the base station and the UE is in a frequency range including one or more frequencies above 52.6 GHz. In response to the determination, the processor disables a frequency domain resource assignment (FDRA), modifies a Resource Block Group (RBG) size, or modifies a Resource Indication Value (RIV) determination. The processor generates a Downlink Channel Indicator (DCI) based at least on one or more of the disabled FDRA, the modified RBG size, or the modified RIV determination. The processor transmits, using the transceiver, the DCI to the UE.

In some examples, to disable the FDRA, the processor is configured to set a bit width associated with the FDRA to zero. In some examples, to modify the RBG size, the processor is configured to modify the RBG size to a value greater than 16. In some examples, to modify the RBG size, the processor is further configured to modify a Physical Resource Block (PRB) bundling size.

In some examples, to modify the RIV determination, the processor is configured to:

determine a plurality of RIVs, eliminate one or more RIVs from the plurality of RIVs, and signal an RIV to the UE using remaining ones from the plurality of RIVs.

In some examples, to modify the RIV determination, the processor is configured to determine a minimum Allocated Resource Block (LRB) value and subtract the minimum LRB value from one or more LRB values to generate one or more modified LRB values. The processor is further configured to determine one or more RIVs using the one or more modified LRB values and signal an RIV to the UE using the determined one or more RIVs.

In some examples, to modify the RIV determination, the processor is configured to determine a plurality of RIVs, choose one or more RIVs from the plurality of RIVs for signaling information other than a RIV to the UE, and signal the RIV to the UE using remaining ones from the plurality of RIVs.

Some aspects of this disclosure relate to a method. The method incudes, in response to determining, by a base station, that communication between the base station and a user equipment (UE) is in a frequency range including one or more frequencies above 52.6 GHz, disabling a frequency domain resource assignment (FDRA), modifying a Resource Block Group (RBG) size, or modifying a Resource Indication Value (RIV) determination. The method further includes generating, by the base station, a Downlink Channel Indicator (DCI) based at least on one or more of the disabled FDRA, the modified RBG size, or the modified RIV determination and transmitting, by the base station, the DCI to the UE.

Some aspects of this disclosure relate to a non-transitory computer-readable medium storing instructions. When the instructions are executed by a processor of a base station, the instructions cause the processor to perform operations including, in response to determining that communication between the base station and a user equipment (UE) is in a frequency range including one or more frequencies above 52.6 GHz, disabling a frequency domain resource assignment (FDRA), modifying a Resource Block Group (RBG) size, or modifying a Resource Indication Value (RIV) determination. The operations further include generating, by the base station, a Downlink Channel Indicator (DCI) based at least on one or more of the disabled FDRA, the modified RBG size, or the modified RIV determination and transmitting, by the base station, the DCI to the UE.

Some aspects of this disclosure relate to a user equipment (UE). The UE includes a transceiver configured to wirelessly communicate with a base station and a processor communicatively coupled to the transceiver. The processor receives, using the transceiver, a Downlink Channel Indicator (DCI) from the base station in a frequency range above 52.6 GHz. The DCI is generated based at least one of a disabled frequency domain resource assignment (FDRA), a modified Resource Block Group (RBG) size modified, or a modified Resource Indication Value (RIV) determination. The processor further communicates, using the transceiver, with the base station using information associated with the DCI.

In some examples, the DCI includes a FDRA field including a bit width set to zero. In some examples, the modified RBG size is set to a value greater than 16. In some examples, the DCI includes a RIV determined from a plurality of RIVs from which one or more RIVs are eliminated. In some examples, the DCI includes a RIV determined from a plurality of RIVs and the plurality of RIVs are determine based on a modified Allocated Resource Block (LRB) value. In some examples, the DCI includes a RIV determined from a plurality of RIVs from which one or more RIVs are used for signaling information other than the RIV to the UE.

Some aspects of this disclosure relate to a method performed by a user equipment (UE). The method includes receiving a Downlink Channel Indicator (DCI) from a base station in a frequency range above 52.6 GHz. The DCI is generated based at least one of a disabled frequency domain resource assignment (FDRA), a modified Resource Block Group (RBG) size modified, or a modified Resource Indication Value (RIV) determination. The method further includes communicating with the base station using information associated with the DCI.

Some aspects of this disclosure relate to a non-transitory computer-readable medium storing instructions. When the instructions are executed by a processor of a user equipment (UE), the instructions cause the processor to perform operations including receiving a Downlink Channel Indicator (DCI) from a base station in a frequency range above 52.6 GHz. The DCI is generated based at least one of a disabled frequency domain resource assignment (FDRA), a modified Resource Block Group (RBG) size modified, or a modified Resource Indication Value (RIV) determination. The operations further include communicating with the base station using information associated with the DCI.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 5 illustrates another exemplary table for Resource Indication Value (RIV), according to some aspects of this disclosure.

Figure 1:
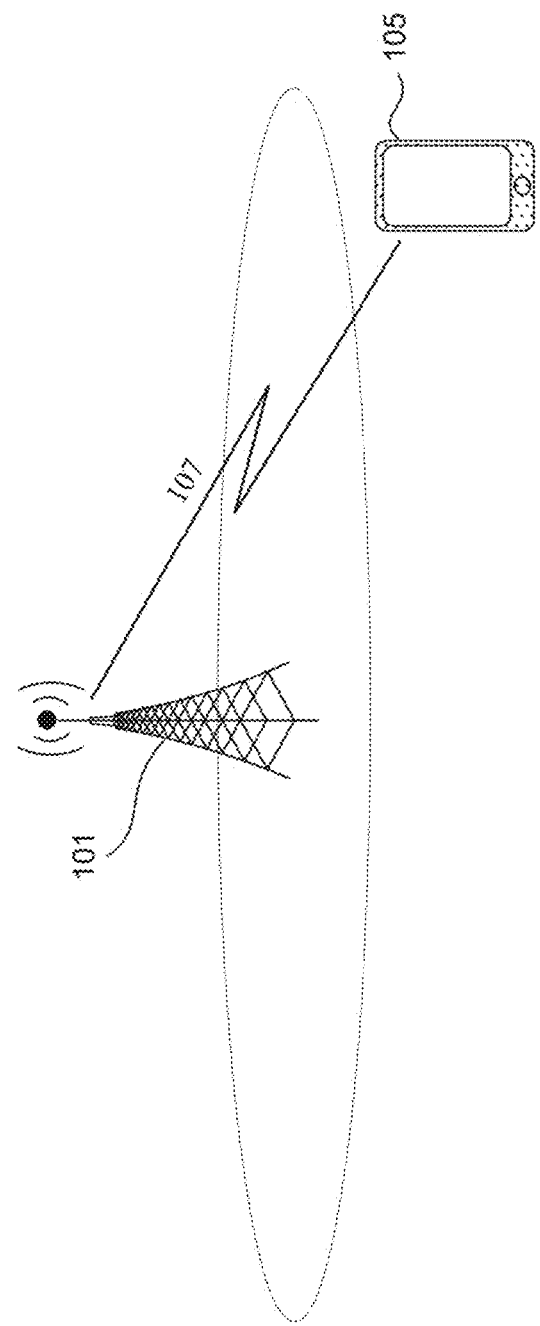
FIG. 1 illustrates an example system implementing designs for implementing downlink (DL) and uplink (UL) scheduling in transmission above 52.6 GHz, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing downlink (DL) and uplink (UL) scheduling in transmission above 52.6 GHz for 3rd Generation Partnership Project (3GPP) releases, such as release 17 (Rel-17) other present/future 3GPP standards.

FIG. 1 illustrates an example system 100 implementing designs for implementing downlink (DL) and uplink (UL) scheduling for communication above 52.6 GHz, according to some aspects of the disclosure. Example system 100 is provided for the purpose of illustration only and does not limit the disclosed aspects. System 100 may include, but is not limited to, network node (for example, a base station such as eNB, gNB, etc.) 101 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using a 3GPP release, such as Release 17 (Rel-17), or other present/future 3GPP standards. UE 105 can include, but is not limited to, wireless communication devices, smart phones, laptops, desktops, tablets, personal assistants, monitors, televisions, wearable devices, Internet of Things (IoTs), vehicle's communication devices, and the like. Network node 101 (herein referred to as base station) can include nodes configured to operate based on a wide variety of wireless communication techniques such as, but not limited to, techniques based on 3GPP standards. For example, base station 101 can include nodes configured to operate using a 3GPP release, such as Rel-17, or other present/future 3GPP standards. UE 105 can be connected to and can be communicating with base station 101 using one or more communication links 107.

Some aspects of this disclosure are directed to new numerology or numerologies (e.g., p value in 3GPP Technical Specification (TS) 38.211) for operation in the frequency range above 52.6 GHz (e.g., one or more frequencies in the frequency range of between about 52.6 GHz and about 71 GHz). Some aspects of this disclosure are directed to addressing impact(s) on physical signals/channels in the frequency range above 52.6 GHz. For example, some aspects of this disclosure discuss time line related aspects adapted to each of the new numerologies, for example, bandwidth part (BWP) and beam switching times, Hybrid Automatic Repeat Request (Hybrid ARQ or HARQ) scheduling, UE processing, preparation and computation times for Physical Downlink Shared Channel (PDSCH), Physical Uplink Shared Channel (PUSCH)/Sounding Reference Signal (SRS) and Channel State Information (CSI), and the like. Some aspects of this disclosure can support up to 64 Signal Block Beam (SSB) beams for licensed and unlicensed operation in the frequency range above 52.6 GHz. Additionally, or alternatively, some aspects of this disclosure can use channel access mechanism(s) assuming beam based operation in order to comply with the regulatory requirements applicable to unlicensed spectrum for frequencies between 52.6 GHz and 71 GHz.

Some aspects of this disclosure are directed to frequency domain scheduling enhancements/optimization for PDSCH/PUSCH, such as, but not limited to, supporting UL scheduling if frequency domain resource allocation with different granularity than FR1/2 (e.g., sub-Physical Resource Block (PRB), or more than one PRB) is supported. Some aspects of this disclosure are directed to time domain scheduling enhancements for PDSCH/PUSCH, such as, but not limited to, increasing a minimum time-domain scheduling unit to be larger than one symbol, supporting multi-PDSCH scheduled by one Downlink Control Information (DCI), supporting one Transport Block (TB) mapped to multiple slots (i.e., Transmit Time Interval (TTI) bundling), and the like. Some aspects of this disclosure are directed to enhancements and/or alternatives to the scheduling request mechanism to reduce scheduling latency due to beam sweeping.

According to some aspects, the DL and UL scheduling (for example in Rel-15) can include time domain scheduling (e.g., using Time Domain Resource Assignment (TDRA) field) and/or frequency domain scheduling (e.g., using Frequency Domain Resource Assignment (FDRA) field). In some examples, TDRA field can be sent using DCI for DL and/or UL scheduling. For example, base station 101 can transmit TDRA field using DCI to UE 105. In some examples, the TDRA field can define a pointer to a row in a lookup table configured by Radio Resource Control (RRC) message(s) and/or other 3GPP methods.

In some examples, time domain scheduling can based on a Mapping Type A or a Mapping Type B. In the Mapping Type A, the resource allocation can be slot based and can include DeModulation Reference Signal (DMRS) symbols in symbol 2 (or 3). In the Mapping Type B, the resource allocation can be mini-slot based and include front loaded DMRS. In some examples, the time domain resource allocation can indicate slot offsets. For example, K0 can be used for DL and K2 can be used for UL. Additionally, or alternatively, the time domain resource allocation can also indicate Starting Symbol within slot (S) and length (L). In one example in Rel-15, time domain resource allocation does not cross slot boundary. In some examples, the time domain resource allocation can also be coded in a single number called the Start and Length Indicator Value (SLIV).

According to some aspects, FDRA field can also be sent in DCI (DL and UL) and can define resource block allocation. For example, base station 101 can transmit FDRA field using DCI to UE 105. In some examples, FDRA field can be sent using one or more of Type 0 DCI (non-fallback DCI only) and Type 1 DCI (fallback and non-fallback DCI). For non-fallback DCI, Radio Resource Control (RRC) can be configured as T0, T1, or dynamic switch (e.g., MSB (most significant bit) indicates the type).

In some examples, a BWP indicator can be used that identifies specific BWP for resource allocation (which can be used for BWP switching). According to some aspects, Resource Allocation Type specifies the way in which a scheduler allocates resource blocks for each transmission. For example, DL/UL Resource Allocation Type 0 can use bitmap to indicate a set of allocated Resource Block Groups (RBG). In some examples, the RBG can be a set of contiguous Virtual Resource Blocks (VRBs). Also, RBG size can be dependent on BWP size and, in some examples, BWP size is configurable. As a non-limiting example, Table 5.1.2.2.1-1 (Nominal RBG size P) and Table 6.1.2.2.1-1 (Nominal RBG size P) of TS 38.214 can indicate the RBG size based on BWP size for Configuration 1 or Configuration 2.

In some examples, in Resource Allocation Type 1, the resource is allocated to one or more consecutive RBs. For example, for DL, a Resource Indicator Value (RIV) is used to allocate a set of Virtual Resource Blocks (VRBs). VRBs may be mapped to interleaved (distributed RA) or non-interleaved (localized RA) Physical Resource Blocks (PRBs). In some examples, interleaved VRBs can be mapped using Resource Block Bundles, for example, using set of contiguous RBs within a BWP, which is different from precoding granularity. In some examples, and for UL, a Resource Indicator Value (RIV) is used to allocate a set of VRBs mapped to a set of contiguous PRBs.

Additionally, or alternatively, the DL and UL scheduling can be considered with slot aggregation. In some examples, without slot aggregation, the time domain resource allocation is not allowed to cross the slot border. In these examples, latency to align slot boundary can be increased. In some examples, with slot aggregation, the repetitions in the next slots use the same time domain resource allocation as the transmission in the first slot.

Ultra-Reliable Low-Latency Communication (URLLC) is a set of features that provide low latency and ultra-high reliability. According to some aspects, system 100 of FIG. 1 can be configured to provide PUSCH repetition information for Rel-16. In some examples, UE 105 can be configured to transmit a number of repetitions across consecutive slots. Base station 101 can be configured to schedule and communicate the PUSCH repetition information to UE 105. In some examples of the DL and UL scheduling for Rel-15, the number of repetitions for PUSCH with slot aggregation can be semi-statically configured. In Rel-16, dynamic indication of the number of repetitions can be supported for PUSCH repetition Type A, using a mechanism similar to PUSCH repetition Type B. In some examples, an additional column for the number of repetitions can be added in the TDRA table. The number of repetitions can be dynamically indicated as part of the TDRA entry, similar as repetition Type B.

For both Dynamic Grant (DG) and Configured Grant (CG), the number of repetitions can be provided by numberOfRepetitions-r16 if it is present in the corresponding TDRA table. In some examples, numberOfRepetitions-r16 is {1, 2, 3, 4, 7, 8, 12, 16} (3 bits), same as repetition Type B. Otherwise the number of repetitions can be determined following Rel-15 procedure (pusch-AggregationFactor for DG and repK for CG).

According to some aspects, system 100, using ULLRC PUSCH Repetition Type B, can support PUSCH repetitions in one slot or across multiple consecutive slots. In some examples, system 100 can support both dynamic grant (DG) and configured grant (CG) (Type 1 and Type 2). According to some examples, base station 101 can schedule PUSCH Repetition Type B by DCI formats 0_1/0_2, not DCI format 0_0. In some examples, base station 101 (e.g., using DCI) can set and communicate TDRA to UE 105. Base station 101 can define TDRA using S (starting symbol), L (length of each nominal repetition), and K (number of nominal repetitions). For example, TDRA field in DCI or Type 1 CG configuration can indicate one of the entries in the TDRA table, which provides the values for S, L and K.

According to some examples, the PUSCH transmission from UE 105 can occur within the time window of L*K symbols, starting from the indicated starting symbol. Each nominal repetition may be segmented into one or more actual repetitions, depending on the slot boundaries and the UL/DL directions of the symbols. If a "nominal" repetition goes across the slot boundary or DL/UL switching point, this "nominal" repetition can split into multiple PUSCH repetitions, with one PUSCH repetition in each UL period in a slot.

In some examples of ULLRC PUSCH Repetition Type B, no DMRS sharing across multiple repetitions occurs, only PUSCH mapping type B is supported, and TBS is determined based on L.

Figure 2A:
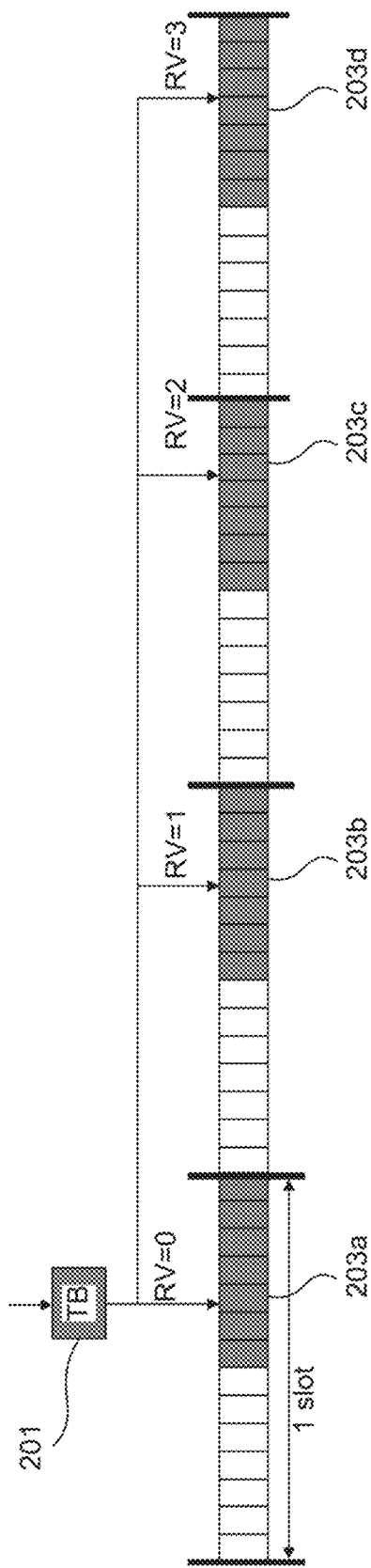
FIG. 2A illustrates one exemplary shared Transport Block (TB) and time and frequency resource allocation, according to some aspects of the disclosure.
Figure 2B:
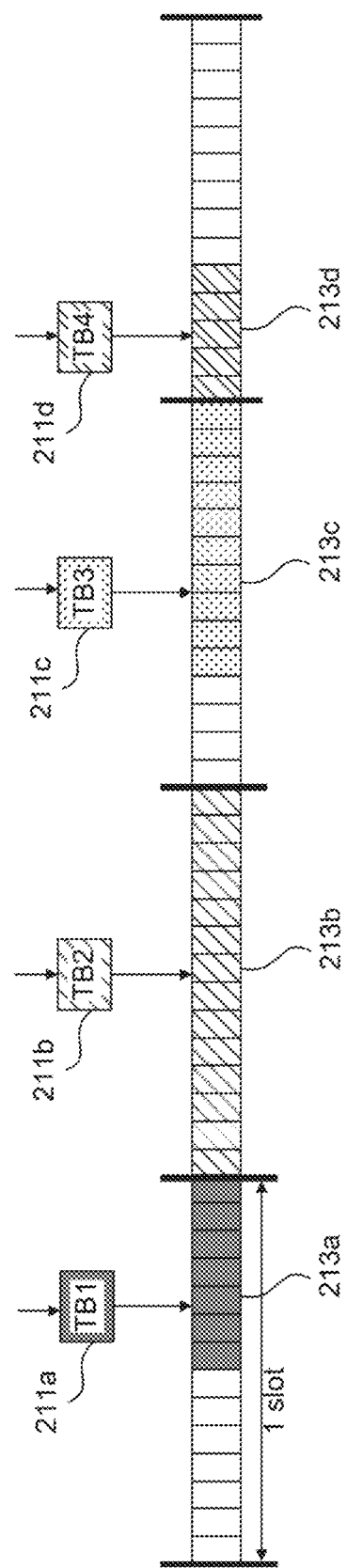
FIG. 2B illustrates one exemplary shared Transport Block (TB) and time and frequency resource allocation for multiple Transmit Time Interval (multi-TTI) (multi-TTI) PUSCH transmission, according to some aspects of the disclosure.

According to some examples, multi-TTI PUSCH transmission in Rel-15 includes repeat transmission in time to support URLLC or to ensure UL coverage. FIG. 2A illustrates one exemplary shared Transport Block (TB) and time and frequency resource allocation, according to some aspects of the disclosure. For example, as illustrated in FIG. 2A, a Transport Block (TB) 201 can be scheduled for multiples slots 203a-203d. In some examples, mutli-TTI PUSCH transmission in Rel-16 NR-U can target to schedule multiple slots and/or mini-slots 213a-213d with different Transport Block (TB) 211a-211d using a single UL grant, as illustrated in FIG. 2B. FIG. 2B illustrates one exemplary shared Transport Block (TB) and time and frequency resource allocation for mutli-TTI PUSCH transmission, according to some aspects of the disclosure. The exemplary FIG. 2B can result in higher efficiency and increased UL transmissions probability.

According to some aspects, common fields for DCI format for Multi-TTI PUSCH of Rel-16 NR-U is provided in Table 1.

TABLE 1 common fields for DCI format for
Multi-TTI PUSCH of Rel-16 NR-U

Identifier for DCI formats
Carrier indicator
Bandwidth part indicator
Modulation and coding scheme
TPC command for scheduled PUSCH
Precoding information and number of layers
Antenna ports
PTRS-DMRS association
beta_offset indicator
DMRS sequence initialization
HARQ process number
Time-Domain RA HARQ process number in Table 1 signaled in the DCI applies to a first scheduled PUSCH. The HARQ process number is then incremented by 1 for subsequent PUSCHs in the scheduled order (with modulo operation as needed). Time-Domain RA of Table 1 at least supports continuous time domain resource assignment with Type A and Type B PUSCHs.

Some aspects of this disclosure are directed to systems and methods to minimize the DCI overhead, for example, time domain resource allocation, frequency domain resource allocation, and the like.

In some examples multi-TTI PUSCH scheduling in Rel-16 NR-U can support multi-TTI PUSCH scheduling using DCI format 0_1. In these examples, the TDRA table configuration allows indicating single or multiple continuous PUSCHs in any slot of the multiple scheduled slots. In some examples, the maximum number of PUSCH in a row can be 8, however, the aspects of this disclosure are not limited to this example. According to some aspects, the number of NDI bits and RV bits in DCI format 0_1 can be determined based on the configured TDRA table. For example, 1 RV bit is used per PUSCH in case multiple PUSCHs are scheduled, one value of {0.2}. Alternatively. 2 RV bits are used for the PUSCH in case only a single PUSCH is scheduled.

Figure 3:
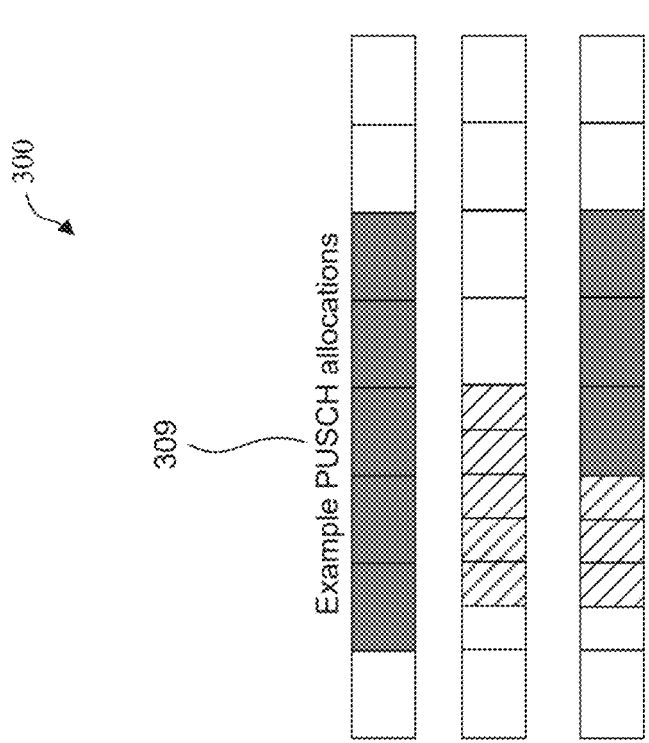
FIG. 3 illustrates one exemplary enhanced TDRA Table for multi-TTI PUSCH scheduling, according to some aspects of this disclosure.

According to some aspects, the legacy TDRA table is extended such that each row indicates multiple PUSCHs (continuous in time-domain). An exemplary enhanced TDRA Table 300 for multi-TTI PUSCH scheduling is illustrated in FIG. 3. Column 301 of FIG. 3 illustrates TDRA index. Column 303 of FIG. 3 illustrates the K2 value. Column 305 of FIG. 3 illustrates SLIV. And column 307 of FIG. 3 illustrates mapping type. In some examples and as illustrated in FIG. 3, each PUSCH can have a separate SLIV and mapping type. The number of scheduled PUSCHs can be signaled by the number of indicated valid SLIVs in the row of the TDRA table signaled in DCI. Example PUSCH allocations 309 associated with each TRDA index is also illustrated in FIG. 3.

According to some aspects, system 100 is configured to operate in the frequency range above 52.6 GHz. In some examples, the range above 52.6 GHz can include a frequency range of between about 52.6 GHz and about 71 GHz. In some examples, in the frequency range above 52.6 GHz, base station 101 and UE 105 can communicate using narrow beams due to the wavelength at the frequency range above 52.6 GHz. In these examples, there is a high probability that only 1 or 2 UEs may be matched to a single beam. In these examples, an scheduler may only have to transmit to a single (or a few) UE(s) especially in the downlink. Therefore, base station 101 does not need to send scheduling information for a lot of UEs. As such, the granularity of the frequency domain resource allocation (FDRA) may be reduced for reduced overhead in the DCI.

According to some aspects, the scheduler is configured to perform the scheduling process. The scheduling process can include a process of allocating resources for transmitting data and can be performed by the network and UE can follow the schedule communicated by the network. In some examples, the scheduler can be part of base station 101. Additionally, or alternatively, the scheduler can be separate from base station 101 but be part of the network associated with base station 101 and be coupled to base station 101. The aspects of this disclosure are not limited to these examples, and the scheduler can have other architectures. In some examples, the scheduler can receive information such as, but not limited to, measurements (from UE 105 and/or the network). Buffer Status Report (BSR), Quality of Service (QoS) requirement(s), associated Radio Bearer, Scheduling Request (SR), and the like. Using this one or more of this information, the scheduler can determine resource allocation and can communicate the resource allocation to UE 105.

According to some aspects, to combat phase noise in the frequency range above 52.6 GHz, subcarrier spacing (SCS) can be increased. The increase in SCS can result in a reduction in the duration of a symbol. The reduction in the duration of the symbol (e.g., a slot) can result in an increase in the number of DCIs that need to be decoded within a specific time interval and the associated scheduling. In some examples, system 100 of FIG. 1 can be configured to increase the minimum time-domain scheduling unit to be larger than one symbol, support multi-PDSCH scheduled by one DCI, and/or support one TB mapped to multiple slots (e.g., TTI bundling). Additionally, or alternatively, the aspects of this disclosure provide methods and system for TDRA to support these schemes. Also, the aspects of this disclosure provide TDRA methods and systems to factor using multiple beams for a specific UE for multi-TTI transmission.

As discussed above, in some examples, system 100 is configured to operate in the frequency range above 52.6 GHz. In these examples, a single UE or a maximum of 2 UEs are within a beam and base station 101 can be configured to reduce FDRA granularity.

According to some aspects, base station 101 is configured to signal to UE 105 that there is only 1 UE per transmission. For example, base station 101 can signal to UE 105 that w % ben base station 101 transmits to UE 105, the transmission is only for UE 105. In this example, base station 101 does not signal FDRA. Therefore, UE 105 will not expect to receive FDRA and assumes that UE 105 is allocated the entire bandwidth. In some examples, base station 101 can indicate to UE 105 that FDRA bit width is 0. For example, base station 101 can use the FDRA field in DCI to indicate to UE 105 that FDRA bit width is 0.

DCI can have different format. For example, DCI format 0_0, format 0_1, format 0_2 (e.g., URLLC based DCI format for Rel-16), and/or format 0_x can be used for scheduling of PUSCH in one cell. For example, DCI format 1_0, format 1_1, format 1_2 (e.g., URLLC based DCI format for Rel-16), and/or format 0_x can be used for scheduling of PDSCH in one cell. DCI can also include other formats such as format 2_0, format 2_1, format 2_2, or format 2_3. DCI can include FDRA field used for frequency domain resource assignment. As discussed above, base station 101 can disable the FDRA field in DCI. For example, base station 101 can use the FDRA field in DCI to set FDRA bit width to 0. Therefore, base station 101 can indicate to UE 105 not to expect to receive FDRA and to assume that UE 105 is allocated the entire bandwidth. In some examples, setting FDRA bit width to 0 is different than disabling TDRA and using RRC signaling only. Disabling the FDRA field (e.g., setting FDRA bit width to 0) can be UE specific and can be different for UL and DL.

According to some aspects, base station 101 can be configured to reduce FDRA granularity by modifying Resource Block Groups (RBG) size. As discussed above with respect to DL/UL Resource Allocation Type 0, the RBG definition is specific to BWP size. As a BWP has a specific SCS, the RBG definition is SCS specific and BWP size specific. The current values of RBG size are limited to a maximum of 16. For example, for BWP of 1 to 36, RBG size is 2 for Configuration 1 and is 4 for Configuration 4. For BWP of 37 to 72, RBG size is 4 for Configuration 1 and is 8 for Configuration 4. For BWP of 73 to 144, RBG size is 8 for Configuration 1 and is 16 for Configuration 4. And for BWP of 145 to 275, RBG size is 16 for both Configuration 1 Configuration 4. Some aspects of this disclosure are configured to modify the values of the RBG size. For examples, the RBG size can be modified to have values more than 16 to reduce FDRA granularity. Additionally. or alternatively, the Physical Resource Block (PRB) bundling size can be modified.

According to some aspects, base station 101 can be configured to reduce FDRA granularity by modifying Resource Indication value (RIV) determination (e.g., modifying RIV calculation). In some examples, the DCI can include the RIV. For example, base station 101 can be configured to, for Resource Allocation Type 1, modify RIV determination/calculation to use a minimum number of allocated RBs. In this example, the maximum RIV value can be reduced and the size of the FDRA field can be reduced.

In one example, base station 101 can be configured to determine or estimate RIV based on one or more parameters. The parameters can include, but are not limited to, one or more of the number of Allocated Resource Blocks (LRBs), starting Allocated Resource Block, and the number of RBs within a Bandwidth Part (BWP). UE 105 can use the RIV to determine the starting Allocated Resource Block and the number of Allocated Resource Blocks. After determining or estimating the RIV, base station 101 can be configured to eliminate any RIVs that is less than or equal to an RIV-threshold. For example, the RIV-threshold can include a maximum RIV associated with a minimum LRB (LRBmin). After eliminating one or more RIVs, the base station can signal RIV in the DCI based on the remaining RIVs in the table. This can be a simple method for reducing the maximum RIV and reducing the size of the FDRA field. In some examples, the RIV of the DCI can be determined as following:

$$\text{If}(L_{RBs}-1) \le [N_{BWP}^{size}/2] \text{ then RIV}=N_{BWP}^{size}(L_{RBs}-1)+RB_{start}, \quad (1)$$

$$\text{Else RIV}=N_{BWP}^{size}(N_{BWP}^{size}-L_{RBs}+1)+(N_{BWP}^{size}-1-RB_{start}). \quad (2)$$

Here, $L_{RBs}$ is the number of Allocated Resource Blocks, $RB_{start}$ is starting Allocated Resource Block, and Nige is the number of RBs within a Bandwidth Part (BWP).

Figure 4:
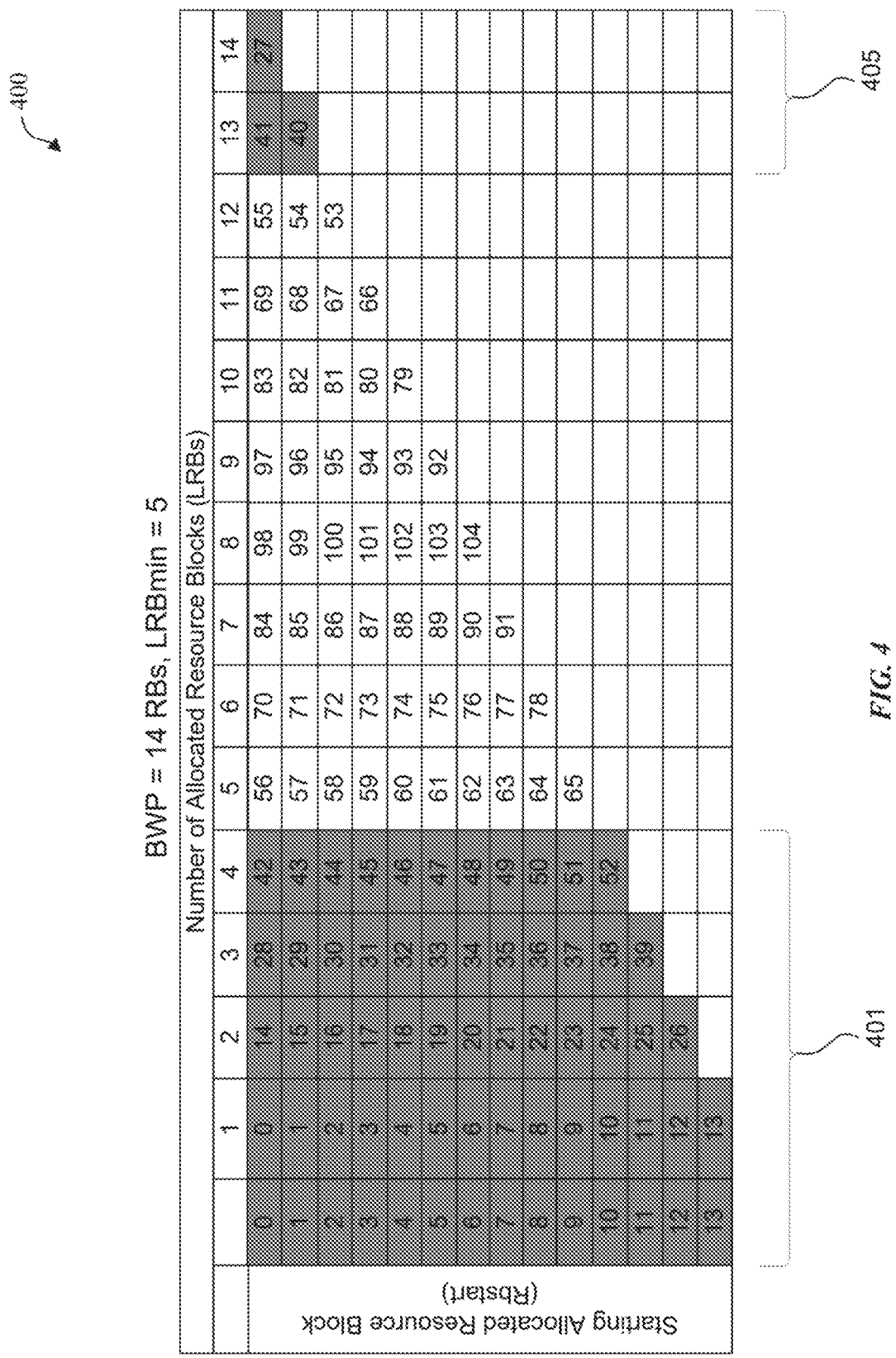
FIG. 4 illustrates an exemplary table for Resource Indication Value (RIV), according to some aspects of this disclosure.

A non-limiting example of modifying RIV determination (e.g., modifying RIV calculation) to use a minimum number of allocated RBs is illustrated in FIG. 4. FIG. 4 illustrates an exemplary table 400 for RIV, according to some aspects of this disclosure. In this example, it is assumed that BWP has RBsize=14 and LRBmin is 5. In this examples, the maximum RIV associated with LRBmin of 5 is 52. In this example, base station 101 eliminates RIVs that are less than or equal to the RIV-threshold of 52. In other words, base station 101 transmits RIVs between 53 and 104, reducing 1 bit for transmitting RIV in this example, and therefore, reducing the size of the FDRA field. Therefore, base station 101 eliminates RIVs associated with LRBs 1, 2, 3, 4, 13, and 14 (columns 401 and 403 of FIG. 4.) In this example, base station 101 eliminates RIVs associated with LRBs less than LRBmin and also eliminates RIVs associated with LRBs 13 and 14 (which are LRBs greater than LRBmin.)

According to some aspects, in addition to, or in alternative to, eliminating any RIVs less than a maximum RIV associated with LRBmin, base station 101 can be configured to determine or estimate RIV table for a smaller number of Allocated Resource Blocks. In other words, base station 101 can change the resolution before determining or estimating RIV. In this example, base station 101 is configured to determine or assume a minimum LRB. Then, base station 101 can subtract the minimum LRB value from the LRB values before determining or estimating RIVs. Then, base station 101 can estimate RIV. In this example, RIVs are effectively mapped to a Resource Block Bundle (RBB of, for example, size LRBmin.) For example, LRActual=LRBeff*LRBmin, where LRBeff is the number of Allocated Resource Blocks. In this example, no RIVs for any LRB size is eliminated.

A non-limiting example of modifying RIV determination (e.g., modifying RIV calculation) by subtracting minimum LRB value is illustrated in FIG. 5. FIG. 5 illustrates an exemplary table 500 for RIV, according to some aspects of this disclosure. In this example, it is assumed that BWP has RBsize=14 and LRBmin is 5. RIV is calculated as discussed above with respect to equations (1) and (2). In this example the effective maximum RIV (RIVeffmax) is 46 (e.g., 5.5 bits) or 55 (e.g., 5.78 bits) compare to 104 (6.7 bits). In this example, no higher level LRB values are eliminated.

According to some aspects, in addition to, or in alternative to, modifying RIV table as discussed above, base station 101 can be configured to use non-utilized RIV values for signaling other information to UE 105. Therefore, base station 101 can reduce the size of the FDRA field by using non-utilized RIV values for signaling other information to UE 105. For example, instead of eliminating columns 401 and 403 of FIG. 4 (that correspond to LRBs 1, 2, 3, 4, 13, and 14), the RIVs in columns 401 and 403 of FIG. 4 can be used for signaling other information to UE 105.

Figure 6:
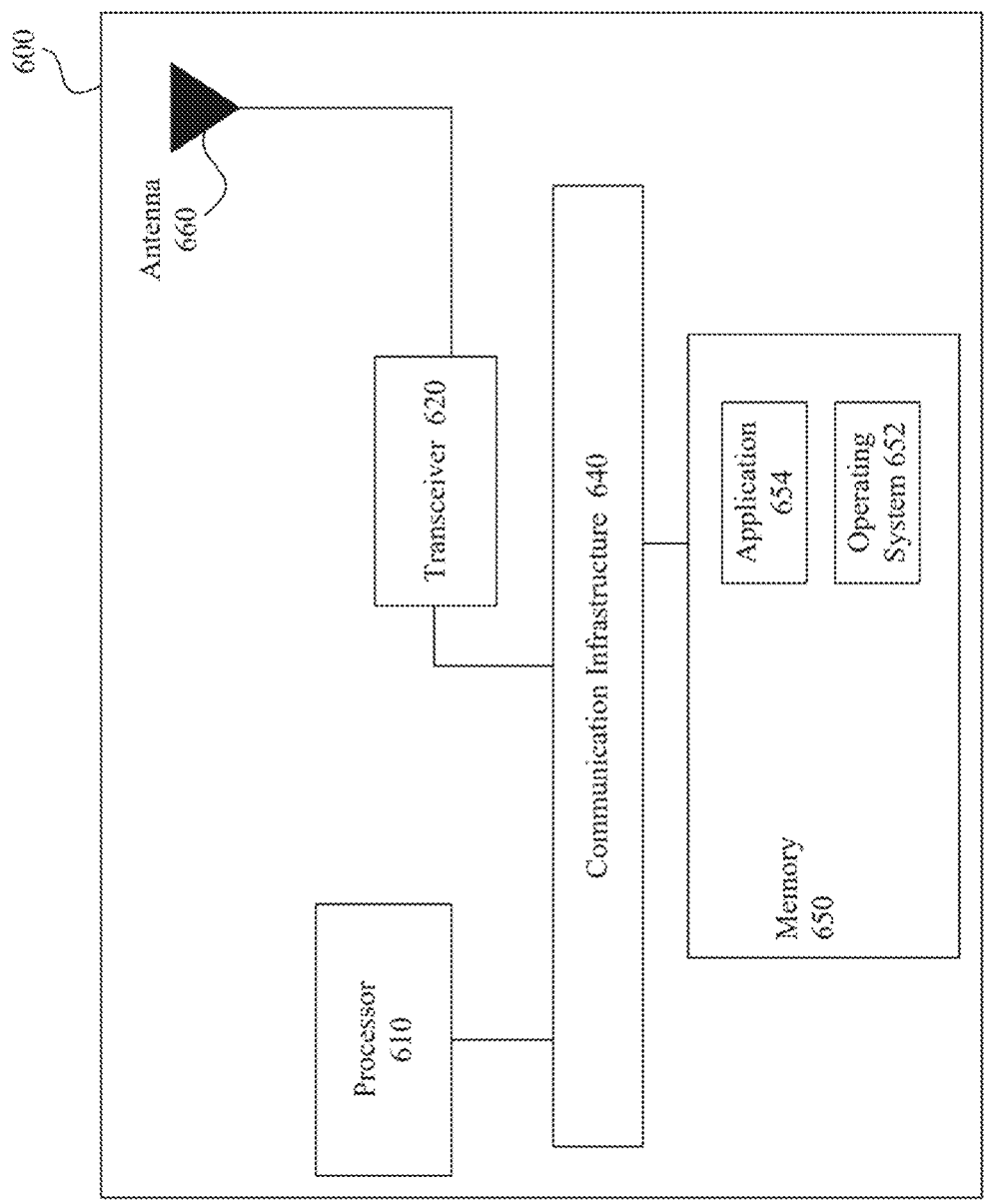
FIG. 6 illustrates a block diagram of an example system of an electronic device implementing mechanisms for downlink (DL) and uplink (UL) scheduling in transmission above 52.6 GHz, according to some aspects of the disclosure.

FIG. 6 illustrates a block diagram of an example system 600 of an electronic device implementing mechanisms for downlink (DL) and uplink (UL) scheduling for communication above 52.6 GHz, according to some aspects of the disclosure. System 600 may be any of the electronic devices (e.g., base station 101, UE 105) of system 100. System 600 includes processor 610, one or more transceivers 620, communication infrastructure 640, memory 650, operating system 652, application 654, and one or more antenna 660. Illustrated systems are provided as exemplary parts of system 600, and system 600 can include other circuit(s) and subsystem(s). Also, although the systems of system 600 are illustrated as separate components, the aspects of this disclosure can include any combination of these, less, or more components.

Memory 650 may include random access memory (RAM) and/or cache, and may include control logic (e.g., computer software) and/or data. Memory 650 may include other storage devices or memory such as, but not limited to, a hard disk drive and/or a removable storage device/unit. According to some examples, operating system 652 can be stored in memory 650. Operating system 652 can manage transfer of data from memory 650 and/or one or more applications 654 to processor 610 and/or one or more transceivers 620. In some examples, operating system 652 maintains one or more network protocol stacks (e.g., Internet protocol stack, cellular protocol stack, and the like) that can include a number of logical layers. At corresponding layers of the protocol stack, operating system 652 includes control mechanism and data structures to perform the functions associated with that layer.

According to some examples, application 654 can be stored in memory 650. Application 654 can include applications (e.g., user applications) used by wireless system 600 and/or a user of wireless system 600. The applications in application 654 can include applications such as, but not limited to, Siri™, FaceTime™, radio streaming, video streaming, remote control, and/or other user applications.

System 600 can also include communication infrastructure 640. Communication infrastructure 640 provides communication between, for example, processor 610, one or more transceivers 620, and memory 650. In some implementations, communication infrastructure 640 may be a bus. Processor 610 together with instructions stored in memory 650 performs operations enabling system 600 of system 100 to implement mechanisms for downlink (DL) and uplink (UL) scheduling for transmission above 52.6 GHz, as described herein.

According to some aspects, one or more transmitters 620 may be coupled to antenna 660. Antenna 660 may include one or more antennas that may be the same or different types. One or more transceivers 620 allow system 600 to communicate with other devices that may be wired and/or wireless. In some examples, one or more transceivers 620 can include processors, controllers, radios, sockets, plugs, buffers, and like circuits/devices used for connecting to and communication on networks. According to some examples, one or more transceivers 620 include one or more circuits to connect to and communicate on wired and/or wireless networks.

According to some aspects of this disclosure, one or more transceivers 620 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 620 can include more or fewer systems for communicating with other devices.

In some examples, one or more transceivers 620 can include one or more circuits (including a WLAN transceiver) to enable connection(s) and communication over WLAN networks such as, but not limited to, networks based on standards described in IEEE 802.11.

Additionally, or alternatively, one or more transceivers 620 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 620 can include a Bluetooth™ transceiver.

Additionally, one or more transceivers 620 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to a 3GPP release, such as Rel-17, or other present/future 3GPP standards.

According to some aspects of this disclosure, processor 610, alone or in combination with computer instructions stored within memory 650, and/or one or more transceiver 620, implements the methods and mechanisms discussed in this disclosure. For example, processor 610, alone or in combination with computer instructions stored within memory 650, and/or one or more transceiver 620, implements mechanisms for disabling or modifying FDRA field as discussed herein. For example, processor 610, alone or in combination with computer instructions stored within memory 650, and/or one or more transceiver 620, implements mechanisms for modifying RIV determination/calculation to reducing the size of FDRA filed as discussed herein. For example, processor 610, alone or in combination with computer instructions stored within memory 650, and/or one or more transceiver 620, implements mechanisms for TDRA methods for beam based Multi-TTI PD(U)SCH scheduling and beam based repetition Type-A/Type-B.

Figure 7:
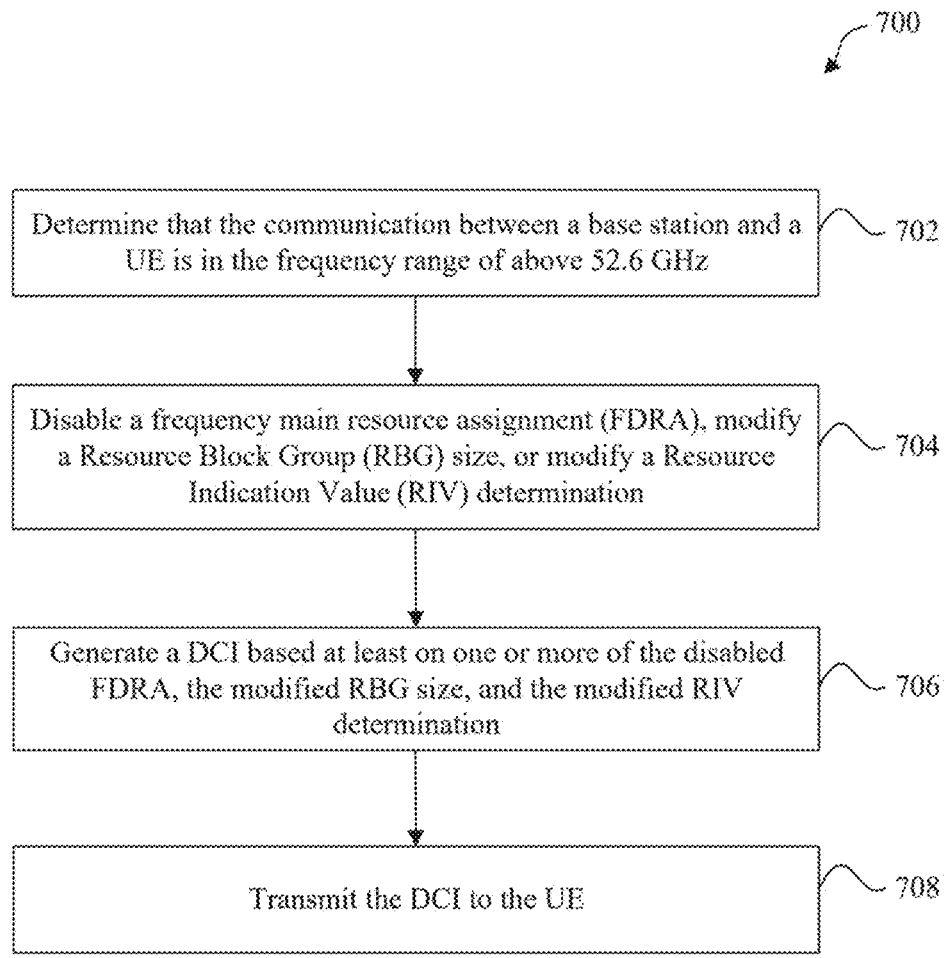
FIG. 7 illustrates an example method 700 for a system (for example, base station) supporting mechanisms for downlink (DL) and uplink (UL) scheduling in transmission above 52.6 GHz, according to some aspects of the disclosure.

FIG. 7 illustrates an example method 700 for a system (for example, base station) supporting mechanisms for downlink (DL) and uplink (UL) scheduling for communication above 52.6 GHz, according to some aspects of the disclosure. As a convenience and not a limitation, FIG. 7 may be described with regard to elements of FIGS. 1, 4, 5, and 6. Method 700 may represent the operation of an electronic device (for example, base station 101 of FIG. 1) implementing mechanisms for implementing downlink (DL) and uplink (UL) scheduling in transmission above 52.6 GHz. Method 700 may also be performed by system 600 of FIG. 6 and/or computer system 900 of FIG. 9. But method 700 is not limited to the specific aspects depicted in those figures and other systems may be used to perform the method as will be understood by those skilled in the art. It is to be appreciated that not all operations may be needed, and the operations may not be performed in the same order as shown in FIG. 7.

At 702, it is determined that the communication between a base station and a UE is in the frequency range above 52.6 GHz. For example, base station 101 is configured to determine that it is communicating with UE 105 in the frequency range above 52.6 GHz.

At 704, and in response to determining that the communication between the base station and the UE is in the frequency range above 52.6 GHz, a frequency domain resource assignment (FDRA) is disabled, a Resource Block Group (RBG) size is modified, and/or a Resource Indication Value (RIV) determination/calculation is modified. In one exemplary aspect, and as discussed above, base station 101 can disable the FDRA field in DCI. For example, base station 101 can use the FDRA field in DCI to set FDRA bit width to 0 to indicate to UE 105 not to expect to receive FDRA and to assume that UE 105 is allocated the entire bandwidth.

Additionally, or alternatively, base station 101 can modify the values of the RBG size. For examples, base station 101 can modify the RBG size to have values more than 16 to reduce FDRA granularity. For example, base station 101 can modify the maximum RBG size to have values more than 16. Additionally, or alternatively, base station 101 can modify the Physical Resource Block (PRB) bundling size.

Additionally, or alternatively, base station 101 can modify Resource Indication value (RIV) determination/calculation to use a minimum number of allocated RBs. As discussed above (e.g., with respect to FIGS. 4 and 5) and as discussed below with respect to FIGS. 8A-8C, the maximum RIV value can be reduced and the size of the FDRA field can be reduced.

At 706, a Downlink Control Information (DCI) is generated. For example, base station 101 generates the DCI based at least on one or more of the disabled FDRA, the modified RBG size, and modified RIV determination.

A 708, the DCI is transmitted to the UE. For example, base station 101 transmits the DCI to UE 105. Base station 101 and UE 105 can use the information associated with the DCI to communicate with each other.

Figure 8A:
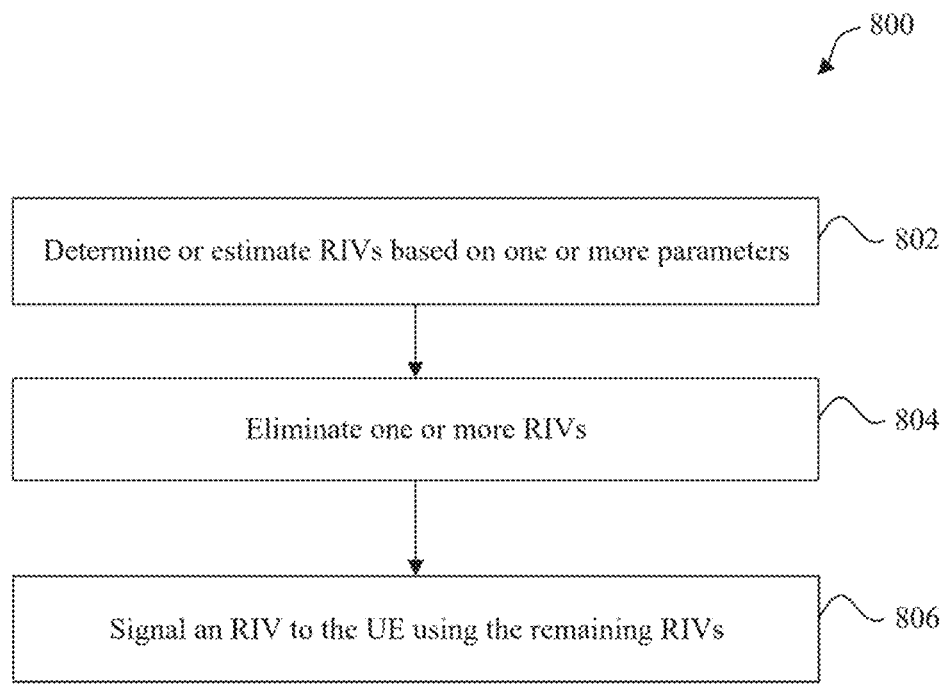
FIGS. 8A-8C illustrate example methods 800, 820, and 840, respectively, for a system (for example, base station) supporting mechanisms for modifying Resource Indication Value (RV) determination in transmission above 52.6 GHz, according to some aspects of the disclosure.
Figure 8B:
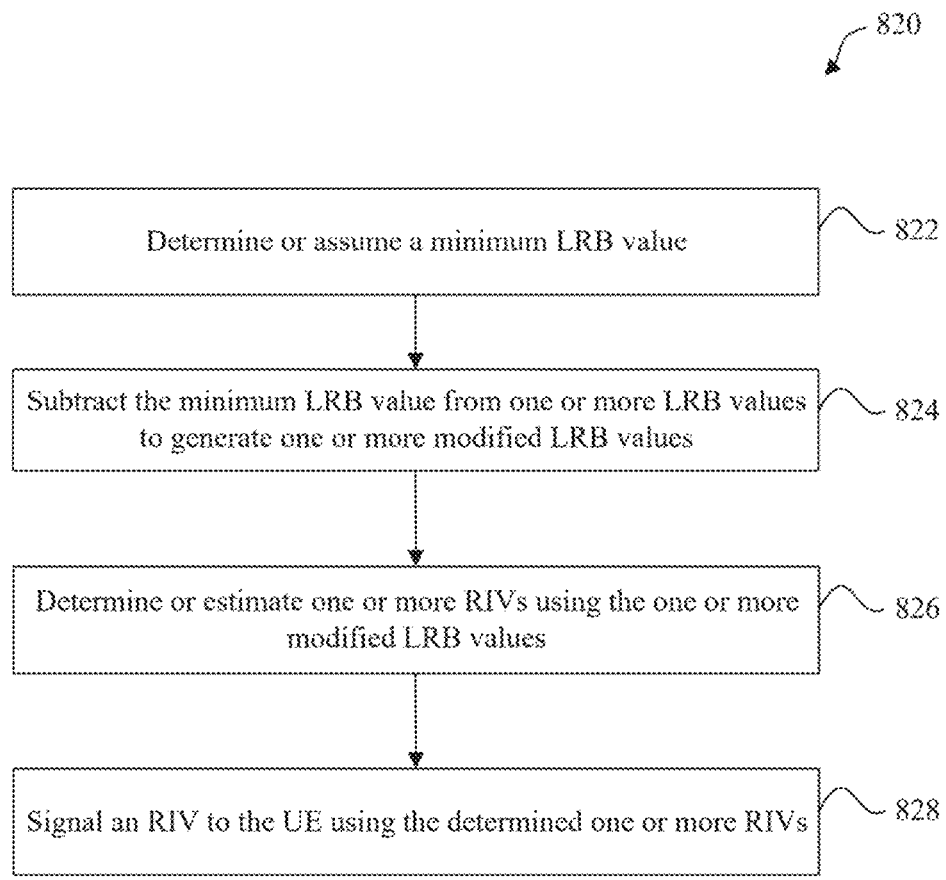
Figure 8C:
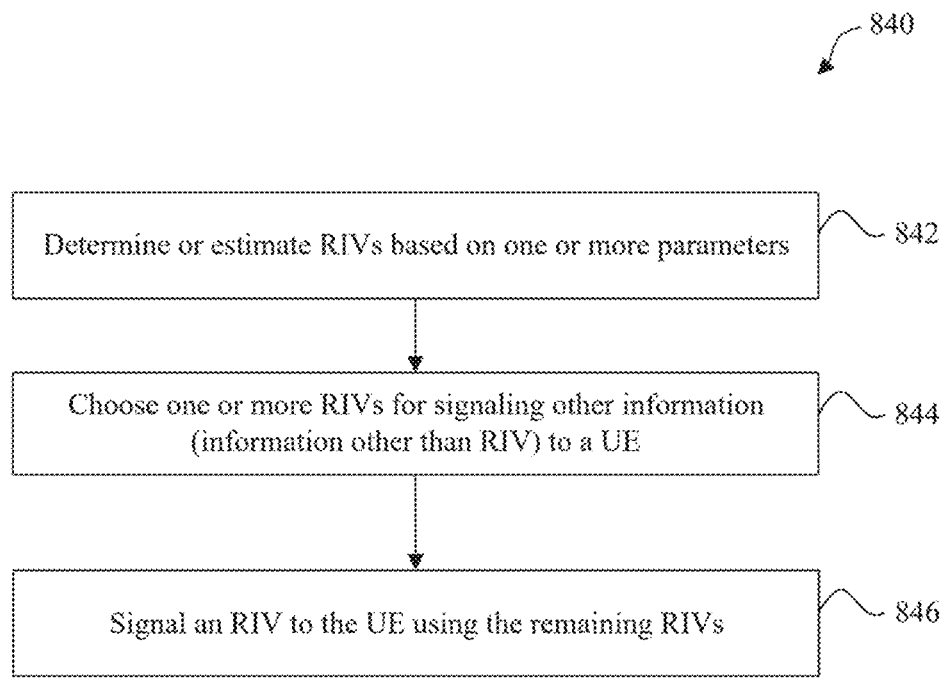

FIGS. 8A-8C illustrate example methods 800, 820, and 840, respectively, for a system (for example, base station) supporting mechanisms for modifying Resource Indication Value (RIV) determination for communication above 52.6 GHz, according to some aspects of the disclosure. As a convenience and not a limitation, FIGS. 8A-8C may be described with regard to elements of FIGS. 1, 4, 5, 6, and 7. Methods 800, 820, and 840 may represent the operation of an electronic device (for example, base station 101 of FIG. 1) implementing mechanisms for modifying RIV determination in above 52.6 GHz transmission. Methods 800, 820, and 840 may also be performed by system 600 of FIG. 6 and/or computer system 900 of FIG. 9. But methods 800, 820, and 840 are not limited to the specific aspects depicted in those figures and other systems may be used to perform the method as will be understood by those skilled in the art. It is to be appreciated that not all operations may be needed, and the operations may not be performed in the same order as shown in FIGS. 8A-8C.

Method 800 of FIG. 8A can be performed as part of steps 704, 706, and 708 of FIG. 7 for modifying RIV determination. At 802, RIVs are determined (e.g., calculated) or estimated based on one or more parameters. For example, base station 101 can determine RIVs using, for example, equations (1) and (2) discussed above. The parameters used for determining RIV can include, but are not limited to, one or more of the number of Allocated Resource Blocks, starting Allocated Resource Block, and the number of RBs within a Bandwidth Part (BWP).

At 804, and after determining or estimating the RIVs, one or more RIVs are eliminated. For example, base station 101 can be configured to eliminate any RIVs that is less than or equal to an RIV-threshold. For example, the RIV-threshold can include a maximum RIV associated with a minimum LRB (LRBmin).

At 806, and after eliminating one or more RIVs, an RIV is signaled to the UE using the remaining RIVs in the table. For example, the base station can signal the RIV in the DCI based on the remaining RIVs in the table.

Method 820 of FIG. 8B can be performed as part of steps 704, 706, and 708 of FIG. 7 for modifying RIV determination. In method 820, base station 101 can be configured to determine or estimate RIV table for a smaller number of Allocated Resource Blocks.

At 822, a minimum LRB is determined or assumed. For example, base station 101 is configured to determine or assume the minimum LRB. At 824, the minimum LRB value is subtracted from the LRB values to generate modified LRB values. For example, base station 101 can subtract the minimum LRB value from the LRB values before determining or estimating RIVs.

At 826, RIVs are determined (e.g., calculated) or estimated using the modified LRB values. For example, base station 101 can determine or estimate RIVs using the modified LRB values. At 828, an RIV is signaled to the UE using the determined RIVs. For example, the base station can signal the RIV in the DCI based on the determined RIVs.

Method 840 of FIG. 8C can be performed as part of steps 704, 706, and 708 of FIG. 7 for modifying RIV determination. At 842, RIVs are determined (e.g., calculated) or estimated based on one or more parameters. For example, base station 101 can determine RIVs using, for example, equations (1) and (2) discussed above. The parameters used for determining RIV can include, but are not limited to, one or more of the number of Allocated Resource Blocks, starting Allocated Resource Block, and the number of RBs within a Bandwidth Part (BWP).

At 844, and after determining or estimating the RIVs, one or more RIVs are chosen for signaling other information (information other than RIV) to the UE. For example, base station 101 can be configured to choose any RIVs that is less than or equal to an RIV-threshold. For example, the RIV-threshold can include a maximum RIV associated with a minimum LRB (LRBmin). Base station 101 can be configured to use the chosen RIVs (e.g., non-utilized RIV values) for signaling other information to UE 105. In this example, instead of eliminating one or more RIVs as discussed in step 804 of FIG. 8A, the RIVs are chosen to use for signaling other information to UE 105.

At 846, and after choosing the one or more RIVs, an RIV is signaled to the UE using the remaining RIVs in the table. For example, the base station can signal the RIV in the DCI based on the remaining RIVs in the table.

In addition to, or in alternative to, the FDRA granularity reduction discussed above, some aspects of this disclosure are directed to TDRA systems and methods for beam based Multi-TTI PD(U)SCH scheduling and beam based repetition Type-A/Type-B.

According to some aspects, and for example in Rel-16, the TDRA table configuration can allow indicating a single PUSCH or multiple continuous PUSCHs in any slot of the multiple scheduled slots. In some examples, the maximum number of PUSCH in a row can be 8 and TDRA can indicate K0/K2, SLIV, and/or Mapping Type. Some aspects of this disclosure are directed to beam-based multiple Transmit Time Interval (multi-TTI) PDSCH/PUSCH scheduling. For example, base station 101 of FIG. 1 can be configured to generate the beam-based multi-TTI PDSCH/PUSCH scheduling and communicate the scheduling to UE 105. The beam-based multi-TTI PDSCH/PUSCH scheduling can be used for communications between base station 101 and UE 105.

In some aspects, the beam-based multi-TTI PDSCH/PUSCH scheduling of this disclosure can allow for both uplink (UL) and downlink (DL) multi-TTI scheduling. Additionally, or alternatively, the beam-based multi-TTI PDSCH/PUSCH scheduling can allow for non-continuous transmission of PDSCH/PUSCH. For example, the beam-based multi-TTI PDSCH/PUSCH scheduling can be used to signal multiple K0/K2 values. In some examples, the beam-based multi-TTI PDSCH/PUSCH scheduling can be used to signal multiple SLIVs. In some examples, one SLIV can be used for each transmission.

According to some aspects, TDRA signaling can be used for the multi-TTI scheduling. For example, TDRA signaling for the multi-TTI scheduling can be a preconfigured entry. Alternatively, TDRA signaling for the multi-TTI scheduling can be made up of multiple, separate TDRA entries. In some examples, type of multi-TTI scheduling can be semi-statically preconfigured or dynamically selected.

According to some aspects, given that the beam based operation is occurring in the frequency range above 52.6 GHz, the multi-TTI PDSCH/PUSCH scheduling can be allowed to signal alternative beams for transmission by, for example, indicating different Transmission Configuration Indication (TCI) states for each transmission. In some examples, TCIs states can be used to establish a Quasi Co-location (QCL) connection between target reference signals (RS) and source RS.

According to some examples, base station 101 can use implicit signaling to signal the multi-TTI PDSCH/PUSCH scheduling to UE 105. For example, base station 101 can use rotating through beams in a specific order to implicitly signal multi-TTI PDSCH/PUSCH scheduling to UE 105.

According to some examples, base station 101 can use explicit signaling to signal the multi-TTI PDSCH/PUSCH scheduling to UE 105. For example, base station 101 can use TDRA table to explicitly signal multi-TTI PDSCH/PUSCH scheduling to UE 105. In this example, the TDRA table can include TC state in order.

According to some examples, base station 101 can use another explicit signaling to signal the multi-TTI PDSCH/PUSCH scheduling to UE 105. For example, base station 101 can use bitmap(s) to explicitly signal multi-TTI PDSCH/PUSCH scheduling to UE 105. In this example, the bitmap can indicate which of the active TC states should be used.

According to some examples, base station 101 can use another explicit signaling to signal the multi-TTI PDSCH/PUSCH scheduling to UE 105. For example, base station 101 can list beams in order to explicitly signal multi-TTI PDSCH/PUSCH scheduling to UE 105.

According to aspects, where there is a beam change, UE 105 is not expected to start transmission of the next beam within duration of Beam Switching Gap.

Some aspects of this disclosure are also directed to beam based Repetition Type A and/or Type B. In some examples, repetitions can be allowed without explicit DCI. For example, in Repetition Type A, slot repetition can occur by repeating transmission in the next slot at the same symbol. For Repetition Type B, mini-slot repetition can occur by repeating multiple repetitions based on a set of rules. Some aspects of this disclosure are directed to adding beam diversity to Repetition Type A and/or Type B.

According to some examples, base station 101 can use implicit signaling to signal the beam based repetition Type A and/or Type B to UE 105. For example, base station 101 can use rotating through beams in a specific order to implicitly signal beam based repetition Type A and/or Type B to UE 105.

According to some examples, base station 101 can use explicit signaling to signal the beam based repetition Type A and/or Type B to UE 105. For example, base station 101 can use TDRA table to explicitly signal beam based repetition Type A and/or Type B to UE 105. In this example, the TDRA table can include TCI state in order.

According to some examples, base station 101 can use another explicit signaling to signal the beam based repetition Type A and/or Type B to UE 105. For example, base station 101 can use bitmap(s) to explicitly signal beam based repetition Type A and/or Type B to UE 105. In this example, the bitmap can indicate which of the active TC states should be used.

According to some examples, base station 101 can use another explicit signaling to signal the beam based repetition Type A and/or Type B to UE 105. For example, base station 101 can list beams in order to explicitly signal beam based repetition Type A and/or Type B to UE 105.

In some examples for Repetition Type B, if SCS is high and base station 101 preforms symbol-based beam switch, the beam switching gap is accommodated.

Figure 9:
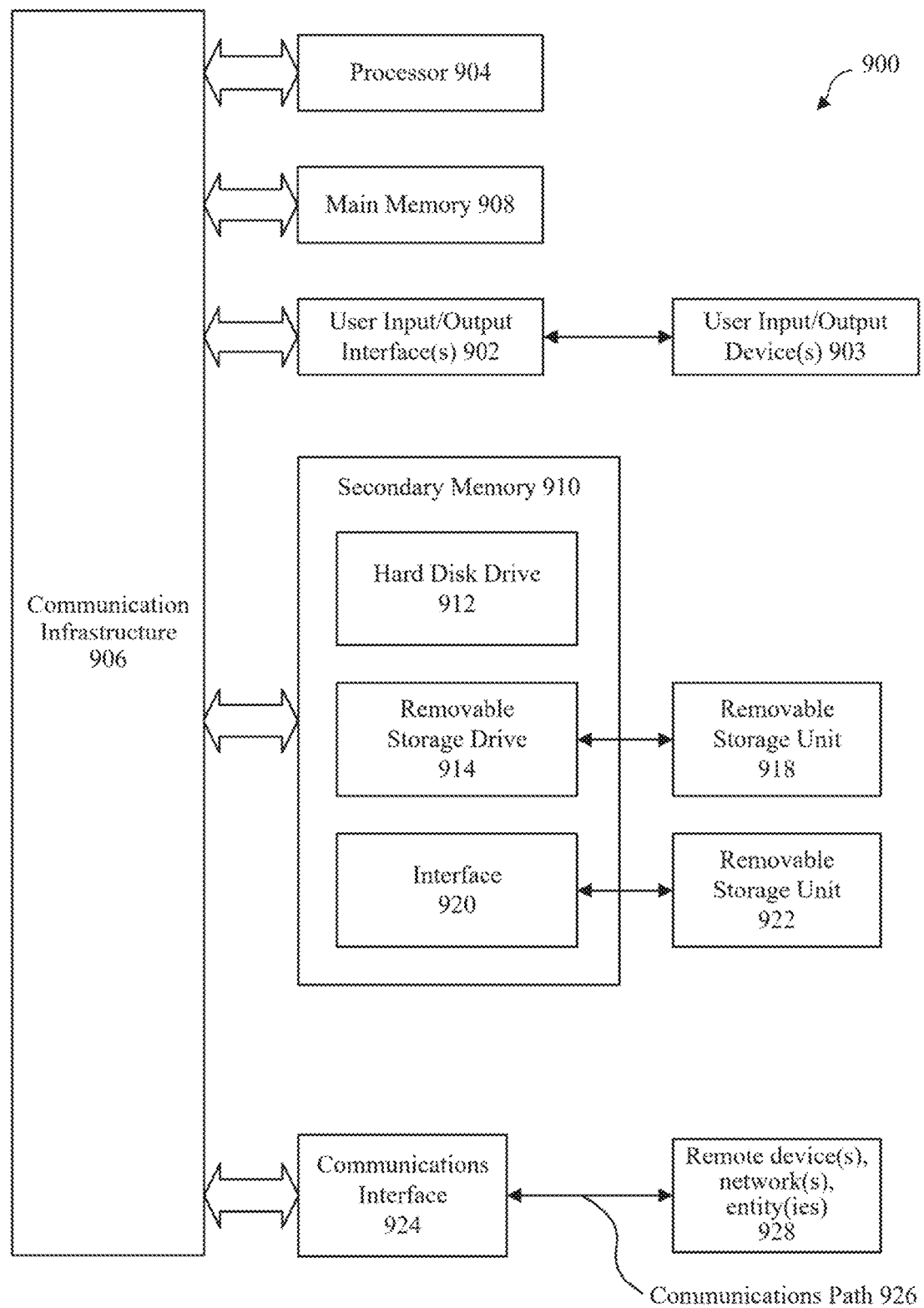
FIG. 9 is an example computer system for implementing some aspects or portion(s) thereof.

Various aspects can be implemented, for example, using one or more computer systems, such as computer system 900 shown in FIG. 9. Computer system 900 can be any well-known computer capable of performing the functions described herein such as devices 101, 105 of FIG. 1, or 600 of FIG. 6. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A base station, comprising:
 a transceiver configured to wirelessly communicate with a user equipment (UE); and
 a processor communicatively coupled to the transceiver and configured to:
  determine that the communication between the base station and the UE is in a frequency range comprising one or more frequencies above 52.6 GHz;
  in response to the determination, disable a frequency domain resource assignment (FDRA), by setting a bit width associated with the FDRA to zero, or modify a Resource Indication Value (RIV) determination based on a minimum Allocated Resource Block (LRB) value;
  generate a Downlink Channel Indicator (DCI) based at least on one or more of the disabled FDRA, or the modified RIV determination; and
  transmit, using the transceiver, the DCI to the UE.

2. The base station of claim 1, wherein to modify the RIV determination, the processor is configured to:
 determine a plurality of RIVs;
 eliminate one or more RIVs from the plurality of RIVs based on the minimum LRB value; and
 signal an RIV to the UE using remaining ones from the plurality of RIVs.

3. The base station of claim 1, wherein to modify the RIV determination, the processor is configured to:
 determine the minimum LRB value;
 subtract the minimum LRB value from one or more LRB values to generate one or more modified LRB values;
 determine one or more RIVs using the one or more modified LRB values; and
 signal an RIV to the UE using the determined one or more RIVs.

4. The base station of claim 1, wherein to modify the RIV determination, the processor is configured to:
 determine one or more RIVs using one or more modified LRB values generated based on the minimum LRB value; and
 signal an RIV to the UE using the determined one or more RIVs.

5. The base station of claim 1, wherein to modify the RIV determination, the processor is configured to:
 determine a maximum RIV based on the minimum LRB value;
 eliminate one or more RIVs from a plurality of RIVs based on the maximum RIV; and
 signal an RIV to the UE using remaining ones from the plurality of RIVs.

6. A method, comprising:
 in response to determining, by a base station, that communication between the base station and a user equipment (UE) is in a frequency range above 52.6 GHz, disabling a frequency main resource assignment (FDRA) by setting a bit width associated with the FDRA to zero or modifying a Resource Indication Value (RIV) determination based on a minimum Allocated Resource Block (LRB) value;
 generating, by the base station, a Downlink Channel Indicator (DCI) based at least on one or more of the disabled FDRA or the modified RIV determination; and
 transmitting, by the base station, the DCI to the UE.

7. The method of claim 6, wherein modifying the RIV determination comprises:
 determining a plurality of RIVs;
 eliminating one or more RIVs from the plurality of RIVs based on the minimum LRB value; and
 signaling an RIV to the UE using remaining ones from the plurality of RIVs.

8. The method of claim 6, wherein modifying the RIV determination comprises:
 determining the minimum LRB value;
 subtracting the minimum LRB value from one or more LRB values to generate one or more modified LRB values;
 determining one or more RIVs using the one or more modified LRB values; and
 signaling an RIV to the UE using the determined one or more RIVs.

9. The method of claim 6, wherein modifying the RIV determination comprises:
 determining one or more RIVs using one or more modified LRB values generated based on the minimum LRB value; and
 signaling an RIV to the UE using the determined one or more RIVs.

10. The method of claim 6, wherein modifying the RIV determination comprises:
  determining a maximum RIV based on the minimum LRB value;
  eliminating one or more RIVs from a plurality of RIVs based on the maximum RIV; and
  signaling an RIV to the UE using remaining ones from the plurality of RIVs.

11. A user equipment (UE), comprising:
  a transceiver configured to wirelessly communicate with a base station; and
  a processor communicatively coupled to the transceiver and configured to:
    receive, using the transceiver, a Downlink Channel Indicator (DCI) from the base station in a frequency range above 52.6 GHz,
      wherein the DCI is generated based on at least one of a disabled frequency domain resource assignment (FDRA) comprising a bit width set to zero or a modified Resource Indication Value (RIV) determination based on a minimum Allocated Resource Block (LRB) value; and
    communicate, using the transceiver, with the base station using information associated with the DCI.

12. The UE of claim 11, wherein the DCI comprises an RIV determined from a plurality of RIVs from which one or more RIVs are eliminated based on the minimum LRB value.

13. The UE of claim 11, wherein the DCI comprises an RIV determined from a plurality of RIVs and wherein the plurality of RIVs are determine based on a modified LRB value determined based on the minimum LRB value.

14. The UE of claim 11, wherein the DCI comprises an RIV determined from a plurality of RIVs from which one or more RIVs are used for signaling information other than the RIV to the UE.

* * * * *

UNITED STATES PATENT AND TRADEMARK OFFICE
CERTIFICATE OF CORRECTION

PATENT NO. : 12,245,209 B2
APPLICATION NO. : 17/439680
DATED : March 4, 2025
INVENTOR(S) : Sun et al.

Page 1 of 1

It is certified that error appears in the above-identified patent and that said Letters Patent is hereby corrected as shown below:

In the Claims

In Column 19, Claim 1, Line 57, delete "(FDRA)," and insert -- (FDRA) --, therefor.

In Column 19, Claim 1, Line 58, delete "zero," and insert -- zero --, therefor.

In Column 19, Claim 1, Line 63, delete "FDRA," and insert -- FDRA --, therefor.

In Column 20, Claim 6, Line 35, delete "main" and insert -- domain --, therefor.

Signed and Sealed this
Twenty-second Day of April, 2025

Coke Morgan Stewart
*Acting Director of the United States Patent and Trademark Office*